(12) United States Patent
Neterer et al.

(10) Patent No.: US 10,850,643 B2
(45) Date of Patent: Dec. 1, 2020

(54) SOFA BASE

(71) Applicant: NORCO INDUSTRIES, INC., Compton, CA (US)

(72) Inventors: Alan Neterer, Elkhart, IN (US); Hermes Hernandez, Elkhart, IN (US)

(73) Assignee: NORCO INDUSTRIES, INC., Compton, CA (US)

(*) Notice: Subject to any disclaimer, the term of this patent is extended or adjusted under 35 U.S.C. 154(b) by 63 days.

(21) Appl. No.: 16/144,372

(22) Filed: Sep. 27, 2018

(65) Prior Publication Data
US 2019/0100119 A1 Apr. 4, 2019

Related U.S. Application Data

(60) Provisional application No. 62/564,763, filed on Sep. 28, 2017.

(51) Int. Cl.
| | |
|---|---|
| *B60N 2/07* | (2006.01) |
| *B60N 2/005* | (2006.01) |
| *B60N 2/02* | (2006.01) |
| *B60N 2/34* | (2006.01) |
| *B60N 2/50* | (2006.01) |
| *B60N 2/12* | (2006.01) |

(52) U.S. Cl.
CPC .......... *B60N 2/0715* (2013.01); *B60N 2/005* (2013.01); *B60N 2/0232* (2013.01); *B60N 2/12* (2013.01); *B60N 2/34* (2013.01); *B60N 2/509* (2013.01); *B60N 2002/0236* (2013.01)

(58) Field of Classification Search
CPC .... B60N 2/0715; B60N 2/005; B60N 2/0232; B60N 2/12; B60N 2/34; B60N 2/509; B60N 2/07; B60N 2/0702; B60N 2002/0236

USPC ......................................................... 297/311
See application file for complete search history.

(56) References Cited

U.S. PATENT DOCUMENTS

| | | | | |
|---|---|---|---|---|
| 3,256,033 | A | * | 6/1966 | Adams ................. B60N 2/0232 296/68 |
| 3,774,964 | A | | 11/1973 | Turner |
| 3,926,396 | A | | 12/1975 | Hall et al. |
| 4,040,660 | A | | 8/1977 | Barecki |
| 4,085,963 | A | | 4/1978 | Bullerdieck |
| 4,120,531 | A | | 10/1978 | Fefferman |
| 4,123,811 | A | | 11/1978 | Aldana |
| 4,218,091 | A | | 8/1980 | Webster |
| 4,431,233 | A | | 2/1984 | Ernst |

(Continued)

FOREIGN PATENT DOCUMENTS

| | | |
|---|---|---|
| DE | 1901045 A1 | 8/1969 |
| DE | 1480466 A1 | 9/1969 |
| DE | 2360627 A1 | 6/1974 |

*Primary Examiner* — Mark R Wendell
(74) *Attorney, Agent, or Firm* — Vorys, Sater, Seymour and Pease LLP; Scott M. Guttman

(57) ABSTRACT

A sofa base system includes a plurality of channel assemblies and a motor. The channel assemblies are disposed on a frame portion adapted for operational engagement with an associated vehicle, and each channel assembly includes a sliding bracket and an outer bracket arranged on the sliding bracket, as well as a guide rod. The sliding bracket and outer bracket are arranged to slide on the guide rods via a plurality of roller members. The sliding bracket and an outer bracket are coupled to a shuttle member that is drive by a drive rod, and the drive rod is operatively connected to the motor via drive shafts and gearboxes.

23 Claims, 14 Drawing Sheets

(56) References Cited

U.S. PATENT DOCUMENTS

| | | | |
|---|---|---|---|
| 4,530,541 A | 7/1985 | Resag et al. | |
| 4,579,386 A | 4/1986 | Rupp et al. | |
| 4,589,301 A | 5/1986 | Griner | |
| 4,595,238 A | 6/1986 | Goldner | |
| 4,802,374 A * | 2/1989 | Hamelin | B60N 2/0232 248/429 |
| 4,805,952 A | 2/1989 | Coleman | |
| 4,852,934 A * | 8/1989 | Yasuda | B60N 2/0232 296/64 |
| 4,971,379 A | 11/1990 | Rumpel et al. | |
| 5,121,895 A * | 6/1992 | Ikegaya | B60N 2/0232 248/420 |
| 5,310,247 A | 5/1994 | Fujimori et al. | |
| 5,318,341 A | 6/1994 | Griswold et al. | |
| 5,501,509 A | 3/1996 | Urrutia | |
| 5,597,205 A | 1/1997 | Glance | |
| 5,697,670 A | 12/1997 | Husted et al. | |
| 5,711,577 A | 1/1998 | Whalen | |
| 5,730,106 A | 3/1998 | Gonzalez | |
| 5,876,096 A * | 3/1999 | Yamakami | B60N 2/0232 192/48.1 |
| 5,909,926 A | 6/1999 | Gonzalez | |
| 6,021,990 A * | 2/2000 | Freund | B60N 2/0232 248/429 |
| 6,056,366 A | 5/2000 | Haynes et al. | |
| 9,776,544 B2 | 10/2017 | Neterer | |
| 2004/0211344 A1* | 10/2004 | Lor | A47B 9/18 108/144.11 |
| 2005/0269842 A1 | 12/2005 | Braun | |
| 2007/0210232 A1* | 9/2007 | Kropfreiter | B60N 2/067 248/429 |
| 2013/0186217 A1* | 7/2013 | Enokijima | B60N 2/067 74/89.33 |
| 2014/0339392 A1* | 11/2014 | Enokijima | F16H 55/22 248/429 |
| 2015/0375639 A1* | 12/2015 | Yin | B60N 2/14 297/157.1 |
| 2016/0075259 A1* | 3/2016 | Couasnon | B60N 2/015 297/344.1 |
| 2019/0202322 A1* | 7/2019 | Napau | B60N 2/067 |

* cited by examiner

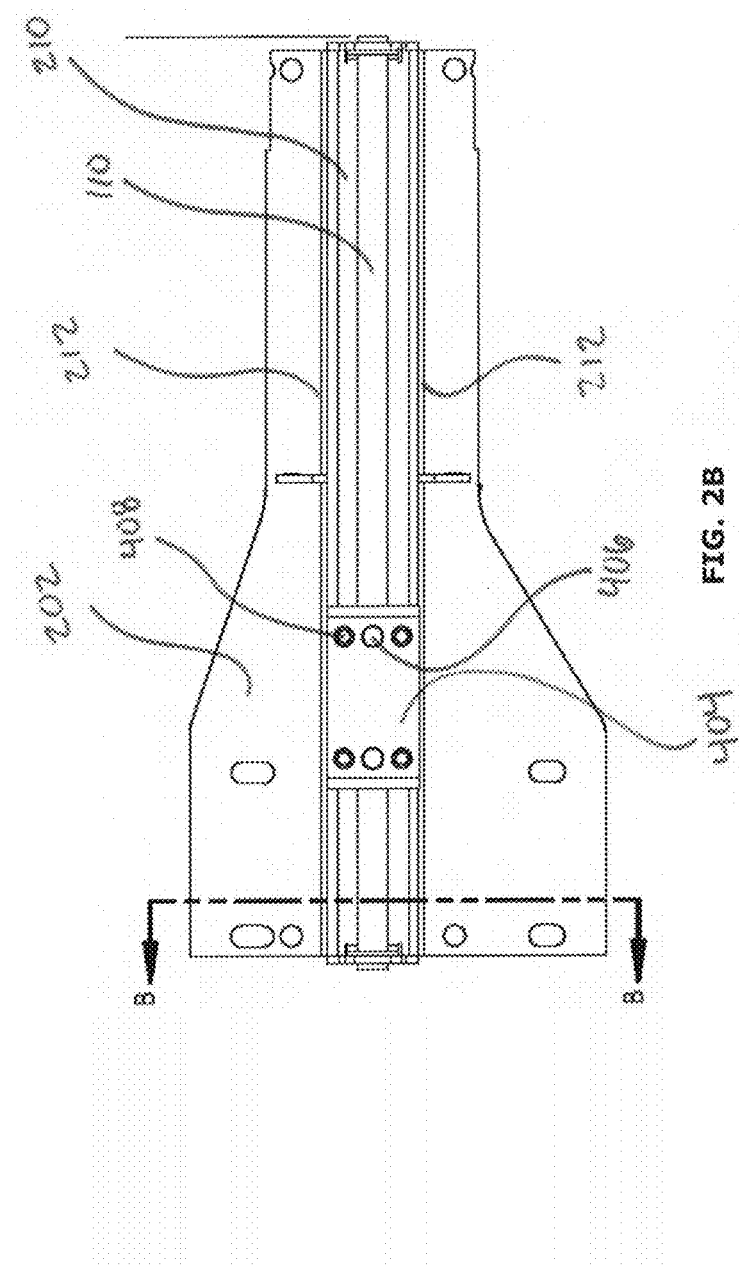
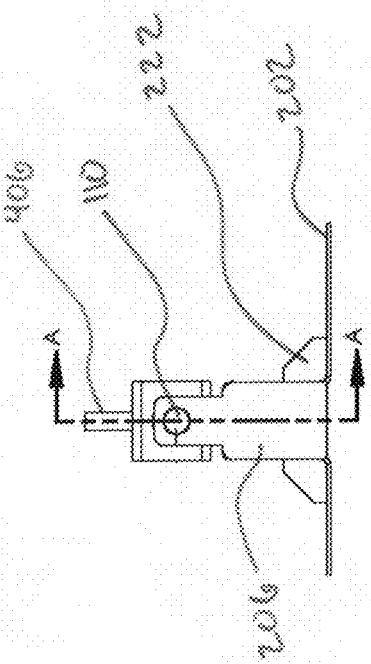
FIG. 2B
FIG. 2C

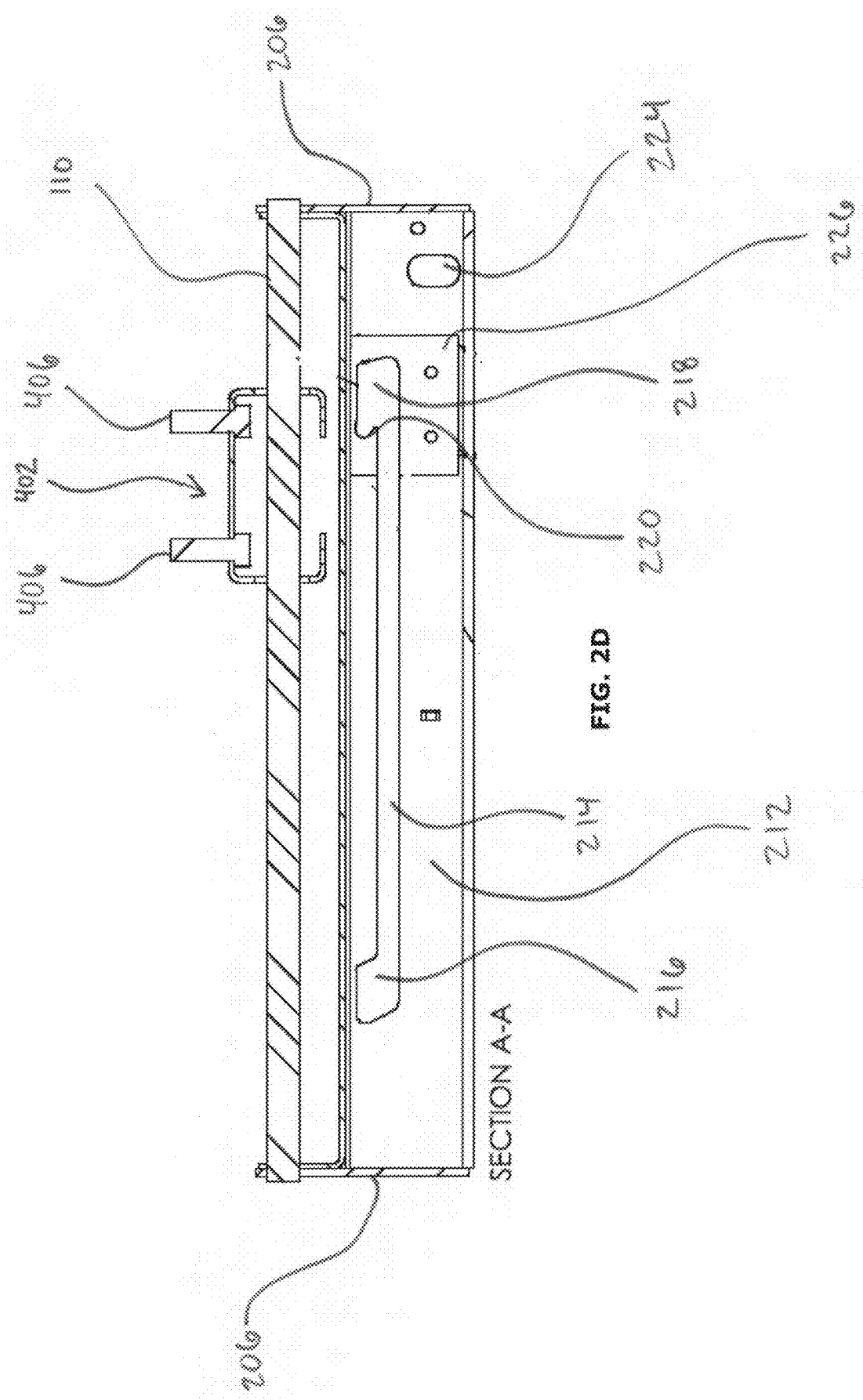

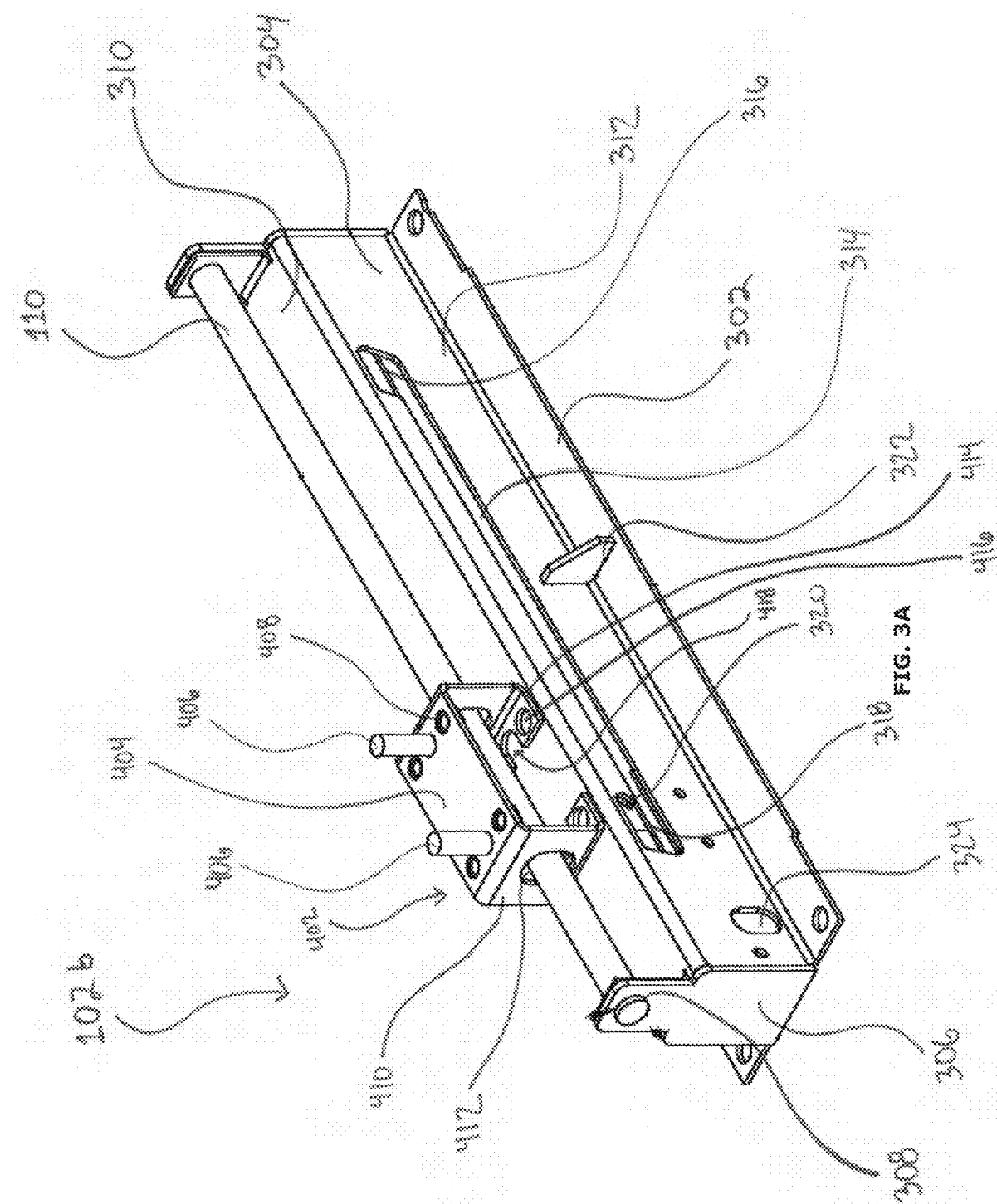

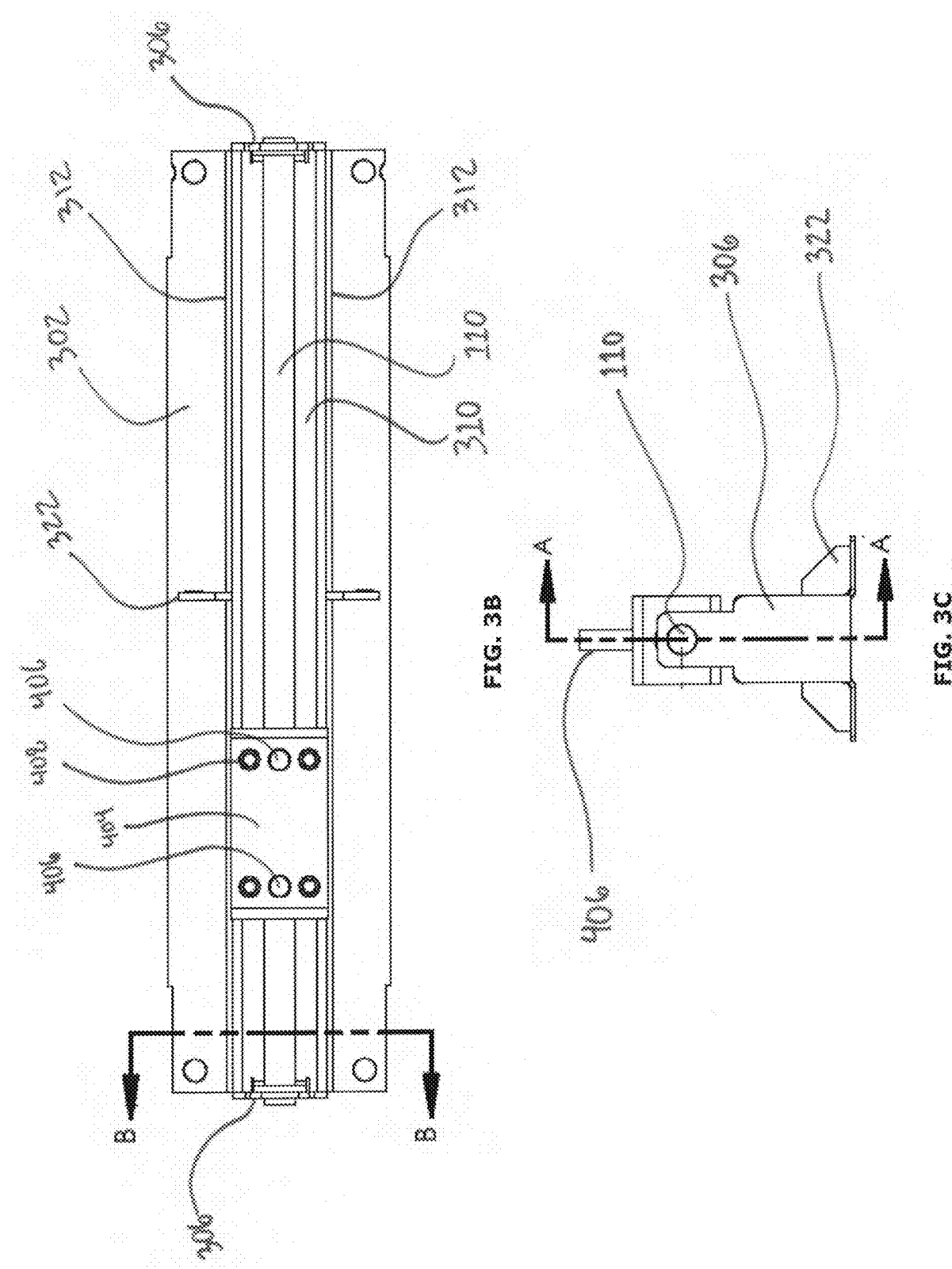

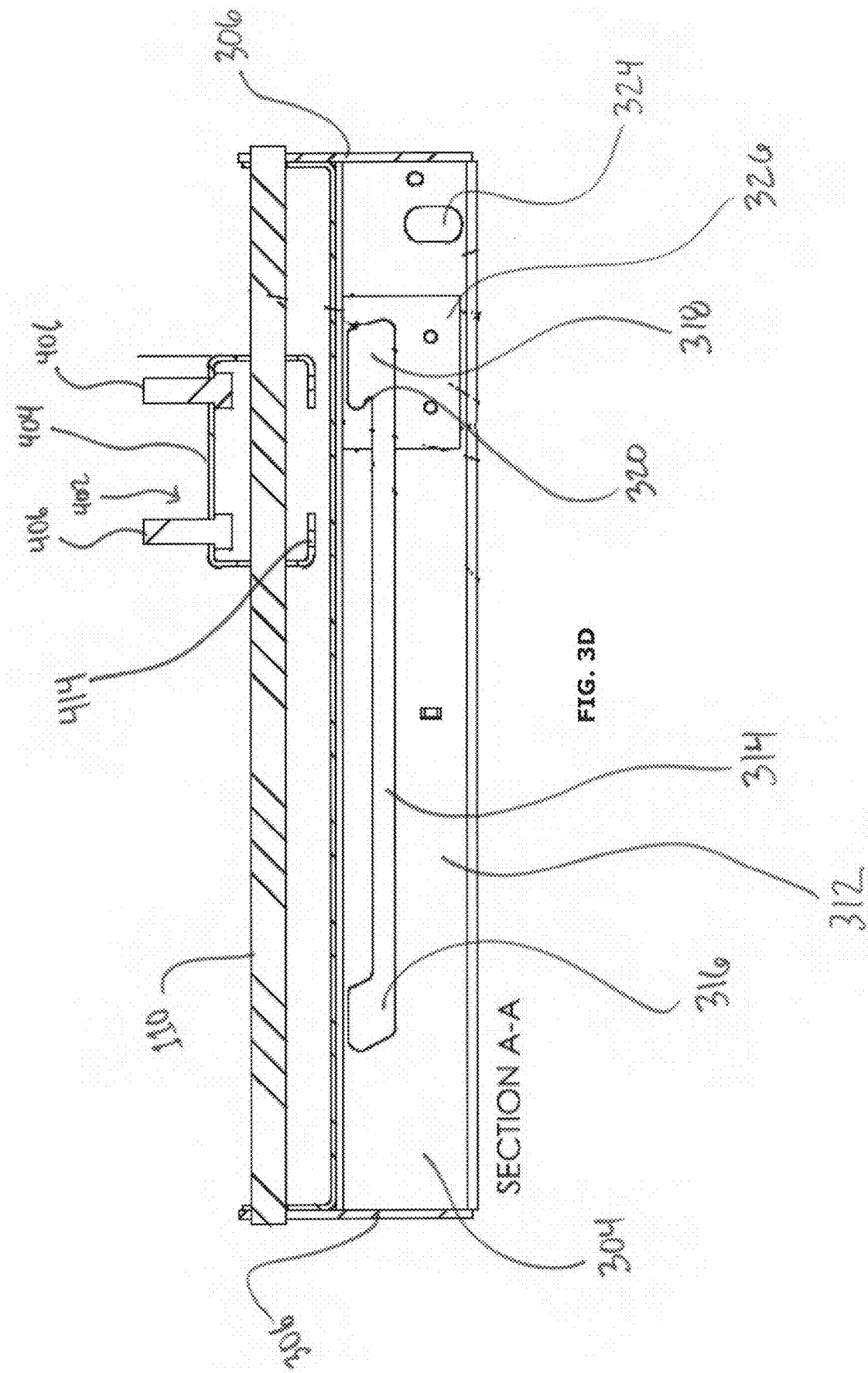

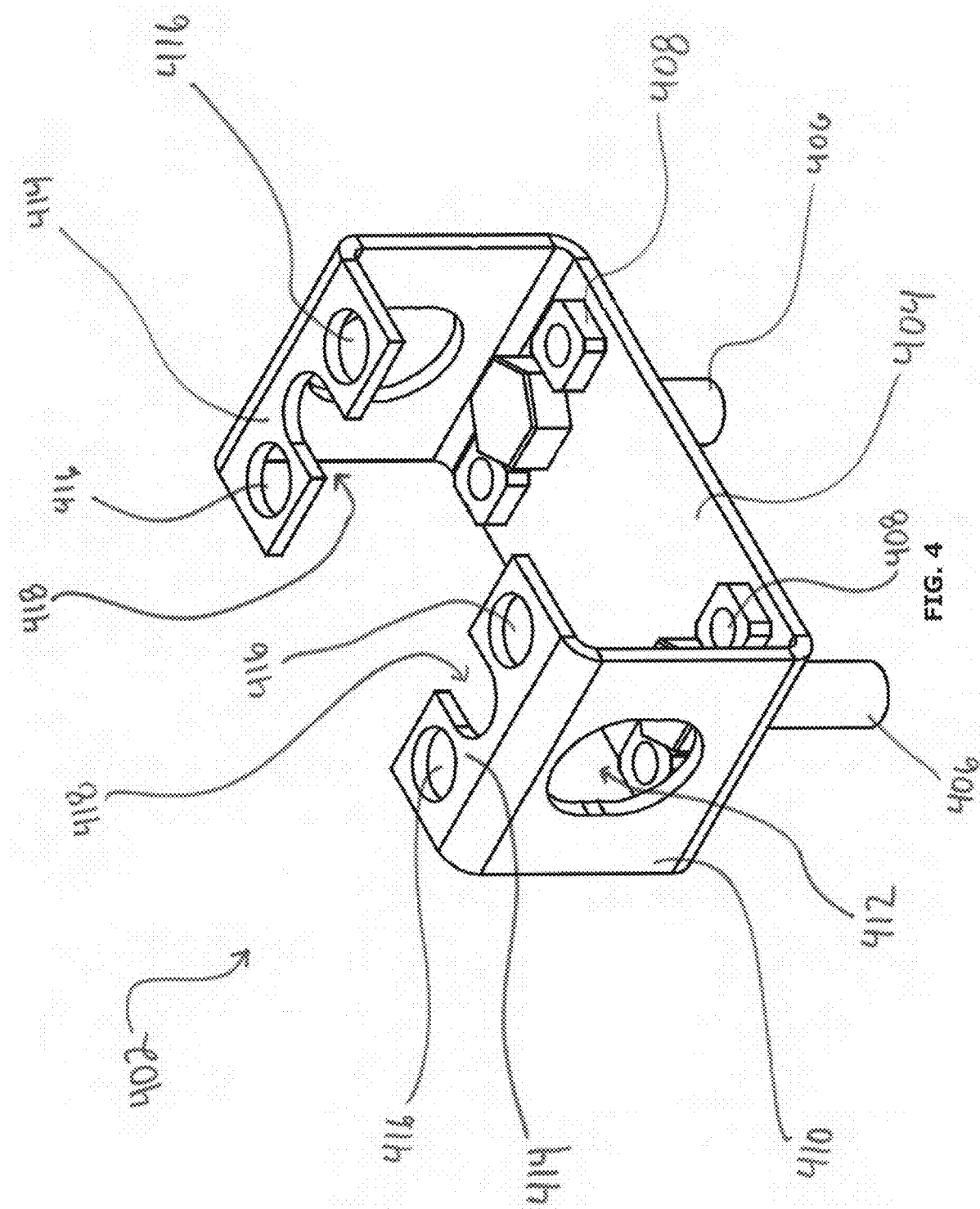

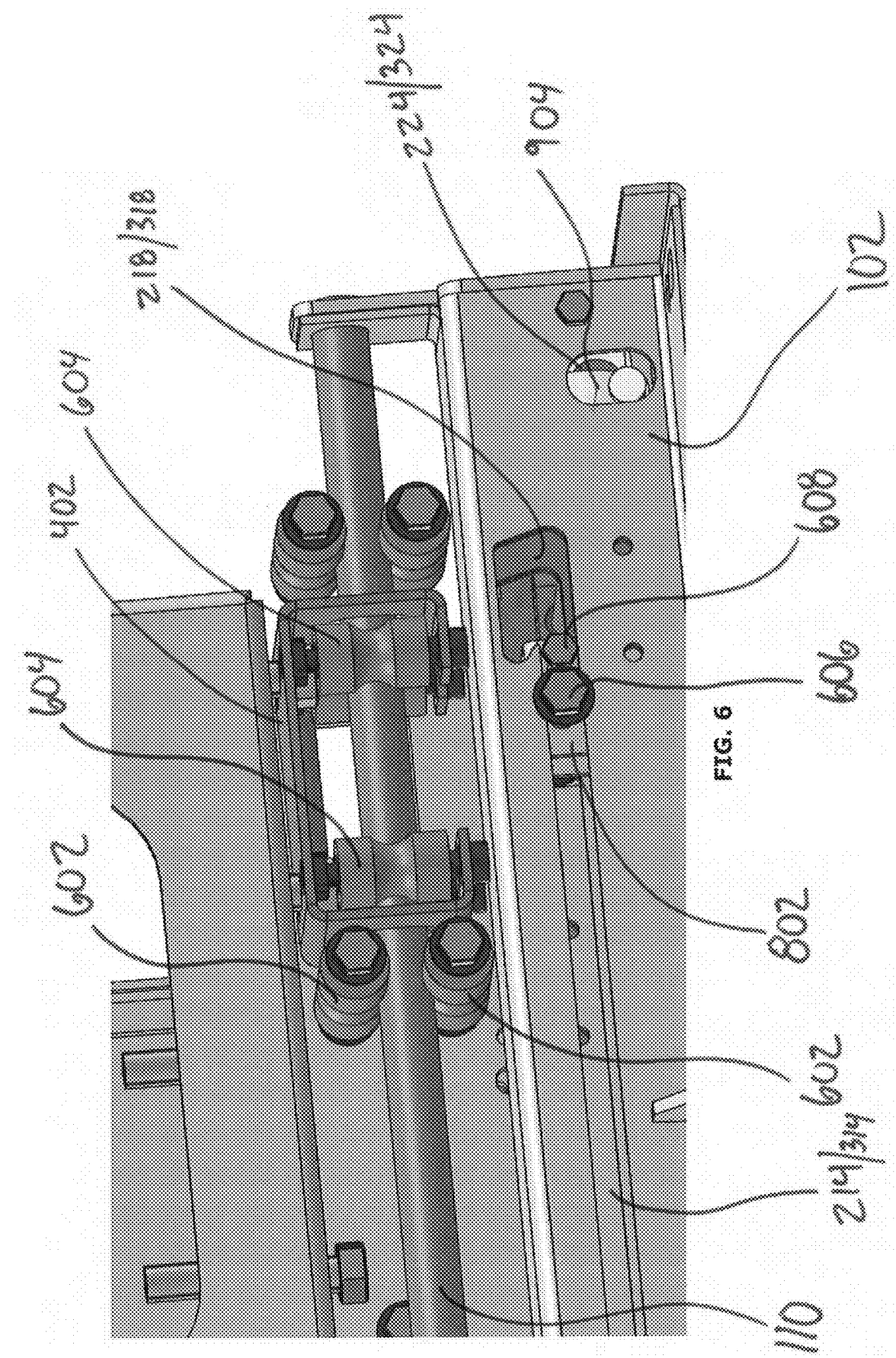

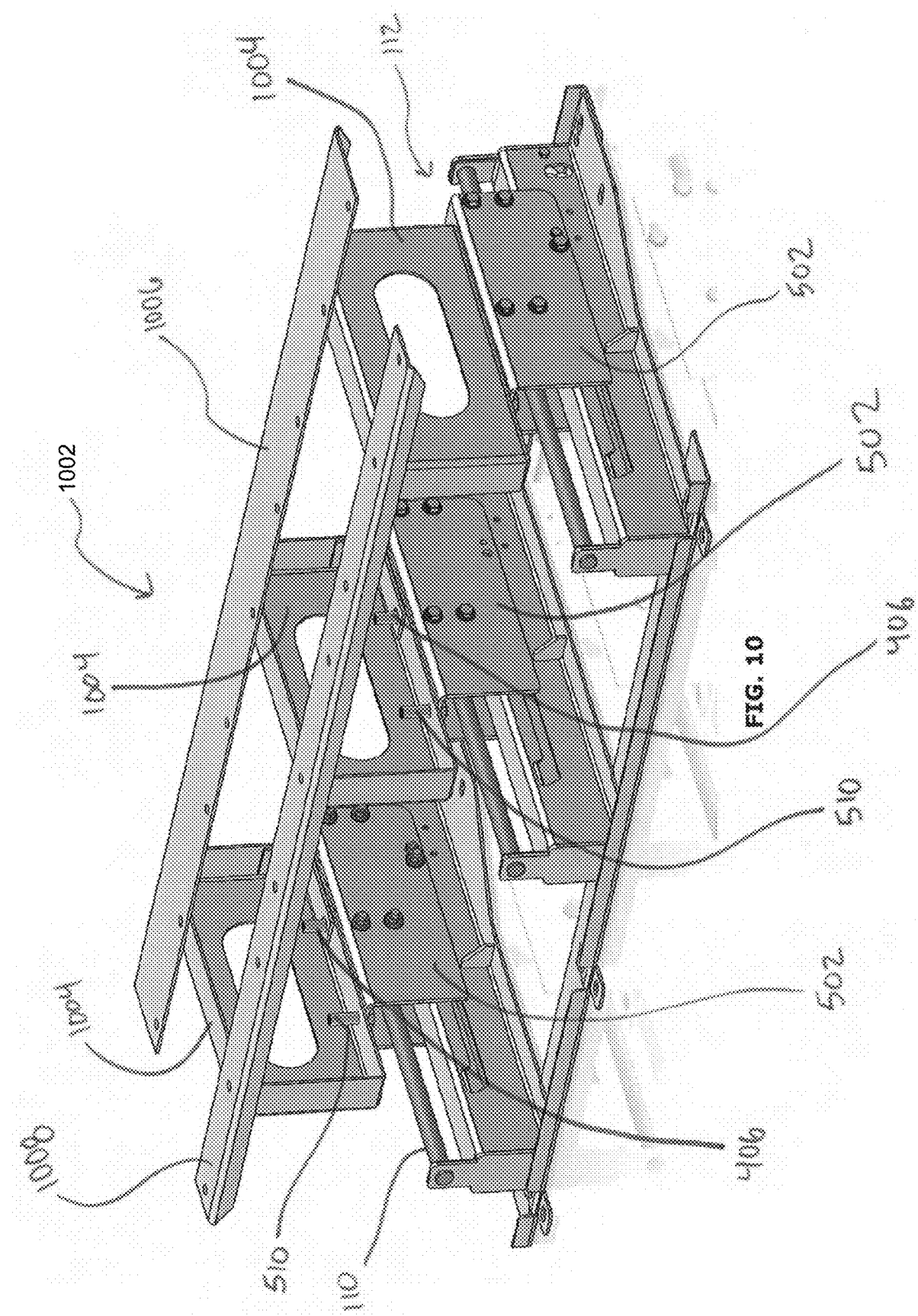

SOFA BASE

CROSS-REFERENCE TO RELATED APPLICATION

This application claims priority to and the benefit of U.S. Provisional Application No. 62/564,763 filed Sep. 28, 2017, which is incorporated by reference herein in its entirety.

BACKGROUND

The present subject matter relates generally to seating. More specifically, the present subject matter relates to a powered base system adapted for use in a vehicle.

Recreational vehicles (each, an "RV") often include upholstered seats and/or sofas for sitting, and these seats and sofas are often times capable of reclining into horizontal orientations such that they may be utilized as beds for sleeping. However, the conventional seats and sofas are often not capable of fully reclining into a substantially horizontal orientation due to insufficient clearance behind the rear of the seat or sofa. For this reasons, conventional vehicle seats and sofas are not desirable, for example, for persons suffering stomach acidity problems. In addition, conventional seats and sofas are undesirable because they do not provide ample storage room behind the seat or sofa.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

FIGS. 2A-2D illustrate various views of a channel assembly according to one or more embodiments.

FIGS. 3A-3D illustrate various views of a channel assembly according to one or more embodiments.

FIG. 4 is an isometric view of a slide bracket according to one or more embodiments.

FIG. 6 illustrates an arrangement of roller members on a guide rod according to one or more embodiments.

FIG. 10 illustrates a sofa base when assembled with an upper sofa assembly.

DETAILED DESCRIPTION

The present disclosure is related to seating and, more particularly, to a lower assembly or base for a seat or sofa in a vehicle such as an RV.

The embodiments described herein provide a seat or sofa base unit (hereinafter referred to as "sofa base") that accommodates utilization of three-point seat belts when the seats or sofa are fully upright, fully reclined, and at any intermediate position there-between. In some embodiments, the sofa base is arranged to accommodate individual seats that may decline independently of each other, whereas in other embodiments the sofa base is arranged to accommodate a multi-person reclining sofa; and, in even other embodiments, the sofa base may be arranged to accommodate both individual seats and a sofa.

In some embodiments, sofa bases according to the present disclosure meet or surpass the relevant Federal Motor Vehicle Safety Standards and, in some of these embodiments, the sofa bases and the components thereof meet or surpass by 115% the Federal Motor Vehicle Safety Standard No. 207 for Multipurpose Passenger Vehicles, Trucks, and Buses as it existed on May 20, 2014. In some embodiments, the components of the sofa bases may be formed, in whole or part, from iron, iron alloy, steel, stainless steel, aluminum, aluminum alloy, or other structural material commonly selected for use in vehicle components.

Figure 1:
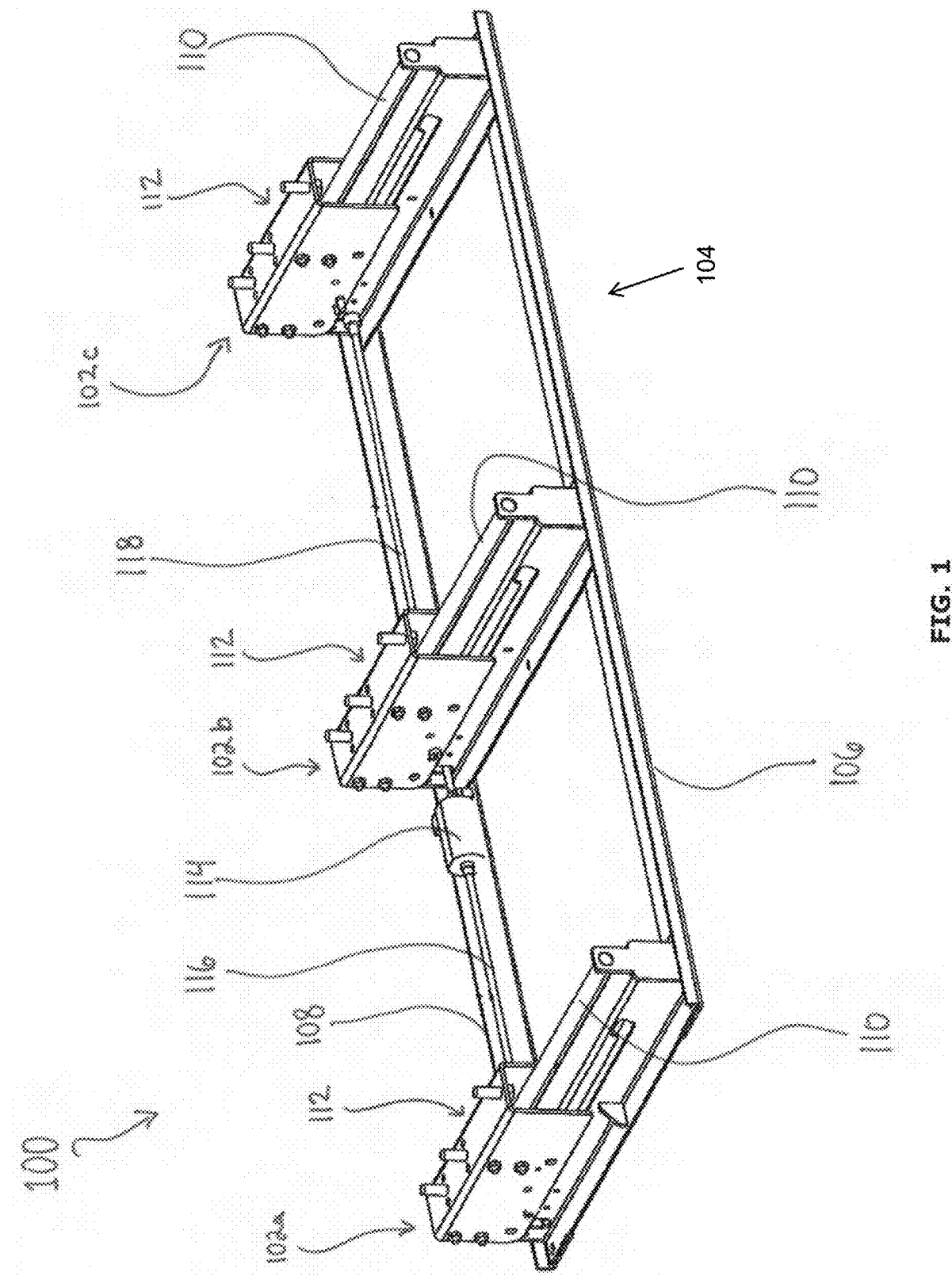
FIG. 1 is an isometric view of a base for a seat or sofa in its un-extended or retracted position according to one or more embodiments.

FIGS. 1-10 illustrate an exemplary embodiment of a sofa base 100 according to one or more embodiments of the present disclosure. FIG. 1 is an isometric view of the sofa base 100. More specifically, FIG. 1 illustrates the sofa base 100 comprising a plurality of channel assemblies 102 arranged on a frame or floor-mounting frame 104. Here, the floor-mounting frame 104 comprises a forward floor strap 106 and a rear floor strap 108, which each include a plurality of mounting holes or slots. These mounting holes or slots may be utilized to secure the floor-mounting frame 104 to a floor (e.g., of an RV) and/or for securing the channel assemblies 102 to the floor-mounting frame 104. As will be appreciated, any number of fasteners and/or joining techniques may be utilized to interconnect the channel assemblies 102 to the floor via the floor-mounting frame 104, for example, bolts and/or welding.

Also in this embodiment, the sofa base 100 includes three channel assemblies 102: a left outer channel assembly 102a, a middle channel assembly 102b, and a right outer channel assembly 102c. It will be appreciated, however, that more or less than three channel assemblies 102 may be utilized without departing from the present disclosure. For example, in some embodiments, the sofa base 100 includes a pair of channel assemblies 102 (e.g., the left outer channel assembly 102a and the right outer channel assembly 102c). In addition, each of the channel assemblies 102 includes a guide rod 110. The sofa base 100 also includes a plurality of slide assemblies 112 that are each arranged to slide or travel along the guide rod 110 relative to its respective channel assembly 102. In the illustrated embodiment, the slide assemblies 112 are arranged to travel approximately fourteen inches along the length of its respective channel assembly 102. In this manner, the sofa and/or seats (not illustrated) installed on the sofa base 100 may be positioned in a fully rearward position so as to provide additional leg room when the sofa and/or seats (not illustrated) are in their upright (seated) positions, or in a fully forward position to provide additional space for the seats and/or sofa (not illustrated) to fold into a reclined position and provide storage space therebehind. Also in the illustrated embodiment, the sofa base 100 may be positioned in any position between the fully rearward position and the fully forward position. In other embodiments, the slide assemblies 112 may be arranged to travel different distances along guide rod 110 greater or lesser than fourteen inches, depending on the particular end use application.

Various actuating means may be utilized to drive the slide assembly 112 along the guide rod 110 and, in the illustrated embodiment, a single motor 114 operatively connected to a pair of drive shafts 116,118 extending from opposing sides of the motor 114 are utilized to actuate the slide assemblies 112 as detailed below. Here, the motor 114 is a 12 Volt direct current motor, and the drive shafts 116,118 are flexible drive cables that are oriented along the length of the rear floor strap 108, approximately perpendicular to the direction of travel of the slide assemblies 112. In other embodiments, however, different motors may be utilized for the motor 114 and different types of shafts may be utilized for the drive shafts 116,118, as will be appreciated by those skilled in the art. In other non-illustrated embodiments, two or more motors may be utilized to actuate or drive the slide assemblies, and such plurality of motors may be synchronized via Hall effect sensors or the like, or mechanical timing assemblies (e.g., timing belts/shafts) as will be appreciated by those skilled in the art. In one embodiment, the slide assemblies 112, or any of them, are non-motorized and actuated by user input such as via a hand crank operative connected to either or both of the drive shafts 116,118. In other embodiments, either or both of the drive shafts 116,118 extend into the channel assemblies 102 from positions exterior the sofa base 100 such that the actuation means (e.g., the motor 114) are provided exterior the sofa base 100.

Figure 2A:
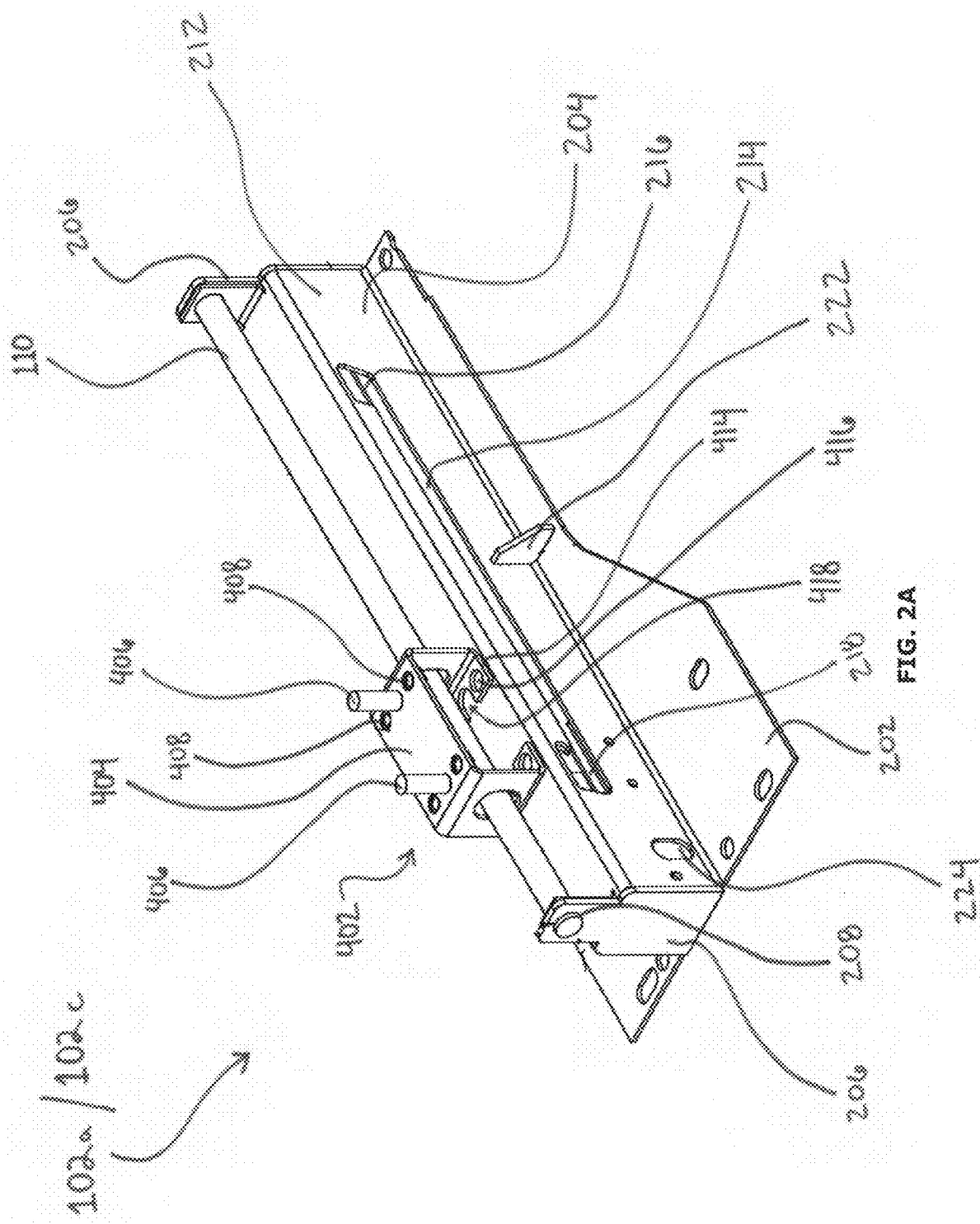

FIGS. 2-3 illustrate various views of the channel assemblies 102. More specifically, FIG. 2 illustrates the left and right outer channel assemblies 102a,102c, which in the illustrated embodiment, are identical, whereas FIG. 3 illustrates the middle channel assembly 102b, which is optional.

As depicted in FIG. 2, the left and right outer channel assemblies 102a,102c each generally comprises a base plate 202 arranged to be secured on top of the mounting frame 104, a channel member 204 disposed on an upper side of the base plate 202, and a pair of faceplates 206 disposed at opposing ends of the channel member 204. In this embodiment, the faceplates 206 each include an aperture 208 at an upper end thereof that is dimensioned to receive the guide rod 110 as illustrated. Also, the channel member 204 includes a top surface 210 that is oriented with the guide rod 110 such that they each extend substantially parallel with each other. In addition, the channel member 204 includes a pair of sides 212 that extend from opposing edges of the top surface 210 such that the top surface 210 and the sides 212 define a "U-shape" cross section.

As illustrated, each of the sides 212 includes a slot 214 that each extend along the length of the sides 212. Accordingly, the slots 214 define the amount of travel that the slide assemblies 112 may be displaced along the guide rod 110, as detailed below. The slots 214 generally include a narrow central portion that allow longitudinal translation in the direction of the guide rod 110. In addition, each of the slots 214 expands into openings 216,218 at each end of the slots 214. Thus, objects (e.g., guide members as detailed below) traveling in the slots 214 may be inhibited from vertical translation relative to the guide rod 110 while traveling longitudinally in the narrow central portion of the slots 214, whereas the openings 216,218 at either end of the narrow central portion of the slots 214 may permit vertical movement of objects that travel into the openings 216,218 from the narrow central portion. In the illustrated embodiment, the opening 218 of each of the slots 214 includes a lip portion 220 that acts as a "catch." The lip portion 220 may operate to secure an object within the opening 218 of the slot 214, which may in turn help prevent any unintended movement, such as an unintended forward movement that may be experienced in a crash.

Also in this embodiment, a stop gusset 222 is provided on the base plate 202 and the sides 212 at a location between the larger openings 216,218 at each end of the slots 214. In addition, the sides 212 each include an opening 224 at an end of the channel member 204 (i.e., at the end of the channel member 204 proximate to the openings 218), and the openings 224 are arranged to receive a drive input. Here, the openings 224 are configured to receive a drive shaft, such as the drive shafts 116,118. Moreover, one or more reinforcement plates 226 may be provided about all or a portion of any of the slots 214. For example, a pair of the reinforcement plates 226 may be provided about the opening 218 within the interior of the left and right outer channel assemblies 102a, 102c or along an exterior or the channel assemblies 102a, 102c. Here, the reinforcement plates 226 are disposed along the inner sidewalls of the interior of the left and right outer channel assemblies 102a,102c, and include slots with larger openings and lips that correspond with and mirror the openings 218 and the lip portions 220 of the slots 214 in the left and right outer channel assemblies 102a,102c. In other embodiments, the reinforcement plates 226 are arranged about the entirety of the slots 214 rather than just a portion of the central narrow portion and the openings 218.

As mentioned, FIGS. 3A-3D illustrate the middle channel assembly 102b, according to one or more embodiments. Where utilized, the middle channel assembly 102b may be similarly arranged as the left and right outer channel assemblies 102a,102. Thus, the middle channel assembly 102b may include a base plate 302 arranged to be secured on top of the mounting frame 104, a channel member 304 disposed on an upper side of the base plate 302, and a pair of faceplates 306 disposed at opposing ends of the channel member 304. In this embodiment, the faceplates 306 each include an aperture 308 at an upper end thereof that is dimensioned to receive the guide rod 110 as illustrated. Also, the channel member 304 includes a top surface 310 that is oriented with the guide rod 110 such that they each extend substantially parallel with each other. In addition, the channel member 304 includes a pair of sides 312 that extend from opposing edges of the top surface 310 such that the top surface 310 and the sides 312 have a "U-shape" cross section. Moreover, each of the sides 312 includes a slot 314, respectively, that each extend along the length of the sides 312 generally parallel to the guide rod 110. Also, the slots 314 may include a narrow central portion that expands into openings 316,318 at each end of the slots 314. In the illustrated embodiment, the opening 318 of each of the slots 314 includes a lip portion 320 as detailed above. Also in this embodiment, a stop gusset 322 is provided on the base plate 302 and the sides 312 at a location between the openings 316,318 at each end of the slots 314. In addition, the sides 312 each include an opening 324 at an end of the channel member 304 near the openings 318, and the openings 324 are arranged to receive a drive shaft, such as the drive shafts 116,118. In the illustrated embodiments, the slots 314 are identical to the slots 214 and, therefore, the descriptions of slots 214 and component interacting therewith are applicable to the slots 314. Moreover, a pair of reinforcement plates 326 may be provided, for example, within the interior of the middle channel assembly 102b, as detailed above.

In the illustrated embodiment of FIGS. 2-3, a slide bracket 402 is provided on each of the channel assemblies 102 and configured to translate along the guide rods 110 thereof. The slide bracket 402 is part of the slide assembly 112. FIG. 4 further illustrates the slide bracket 402 according to one or more embodiments of the present disclosure. As illustrated, the slide bracket 402 includes a top plate 404 with a plurality of support rods 406 extending upward therefrom, and a plurality of mounting holes 408 extending there through. In the illustrated embodiment, the slide bracket 402 includes a pair of support rods 406 and four mounting holes 408. The mounting holes 408 are arranged in the top plate 404 to receive one or more roller members as more fully detailed below. Also as will be detailed below, the support rods 406 are configured to secure other components to the slide bracket 402.

The slide bracket 402 also comprises a pair of sides 410 that each include an aperture 412 that is dimensioned to receive the guide rod 110 as illustrated. In addition, the slide bracket 402 includes a pair of feet 414 that inwardly extend from a bottom end of each of the sides 410, in an orientation that is substantially parallel with the top plate 404. Here, each of the feet 414 include a pair of mounting holes 416 that respectively align with the mounting holes 408 in the top plate 404 to receive one or more roller members as detailed below. In the illustrated embodiment, the top plate 404 includes four mounting holes 408 and each of the feet 414 each include two mounting holes 461; however, more or less may be utilized where more or less roller members are to be utilized. Moreover, each of the feet includes a cutout or recess 418 that, in this embodiment, is arranged between the pair of mounting holes 416. In the embodiment of FIG. 4, each of the mounting holes 408 is arranged with a welded nut or other fastening means on the underside of the top plate 404, and the support rods 406 are attached to the top plate 404 via a bolt or other fastening means from the underside of the top plate 404.

As previously mentioned, the slide assemblies 112 each include the slide bracket 402 that may house one or more roller members arranged to facilitate the slide bracket 402 traveling along the guide rod 110. In some embodiments, the slide assembly 112 further includes an outer bracket 502 that is arranged on the slide bracket 402. The outer bracket 502 may facilitate utilization of one or more additional roller members that further facilitate movement of the slide assembly 112 along the guide rod 110 and/or provide additional structural rigidity or support of loads (such as seating components) disposed on the sofa base 100 during an end use application.

Figures 5A, 5B:
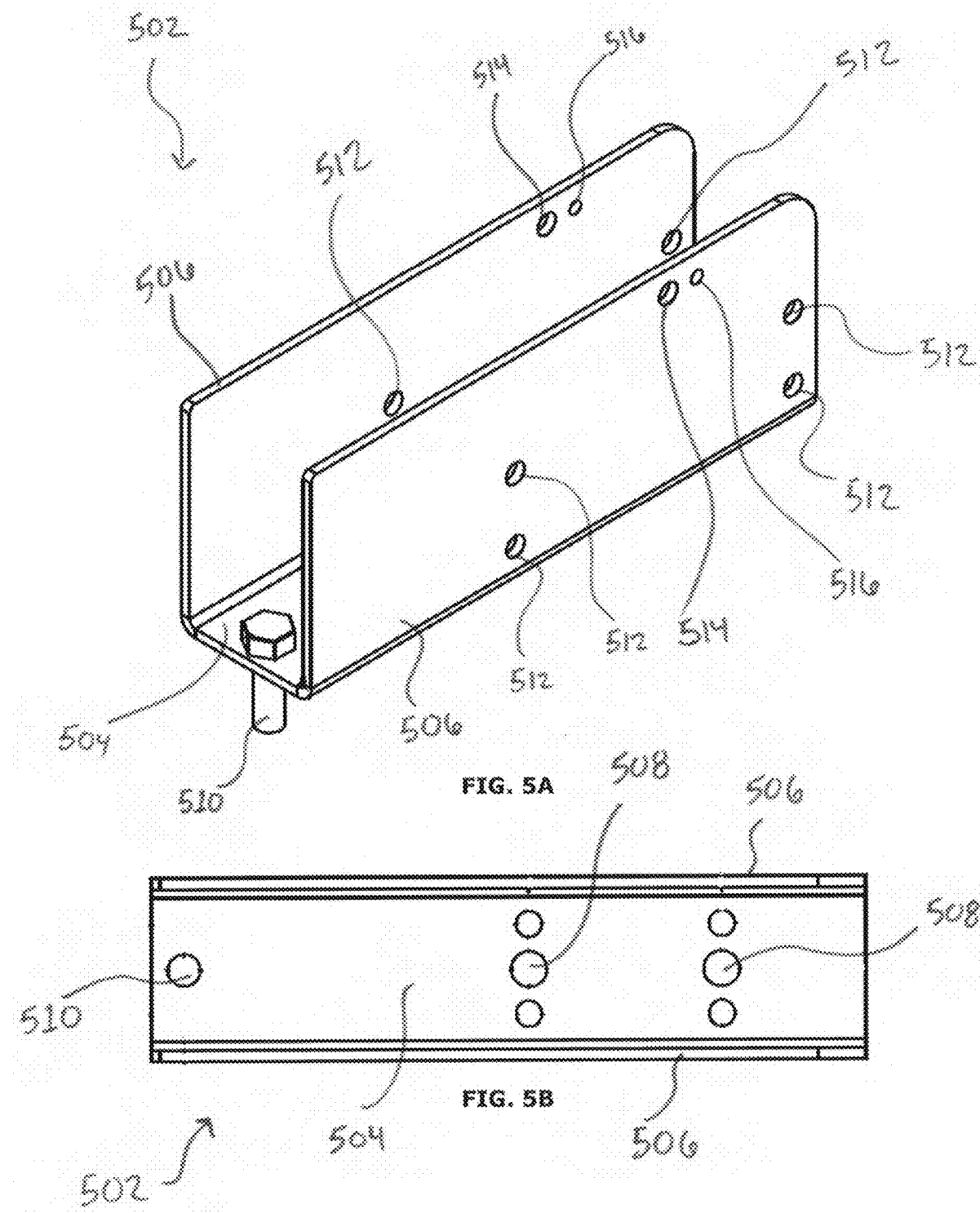
FIGS. 5A and 5B illustrate various views of an outer bracket according to one or more embodiments.

FIGS. 5A-5B illustrates the outer bracket 502 according to one or more embodiments. In the illustrated embodiment, the outer bracket 502 includes a top plate 504 and a pair of side plates 506 that are arranged such that the outer bracket 502 has a "U-shaped" cross section. As will be appreciated, the outer bracket 502 is appropriately dimensioned so that the slide bracket 402 may be nested within the outer bracket 502 and, therefore, the pair of side plates 506 are spaced apart from each other a sufficient distance such that the slide bracket 402 may be arranged therein. As illustrated, the top plate 504 includes a pair of holes 508 that are arranged to receive the support rods 406 of the slide bracket 402 when the outer bracket 502 is arranged over the top of the slide bracket 402. The outer bracket 502 may also include a support rod 510 that extends vertically from a top surface of the top plate 504 in a similar manner and/or orientation as the support rods 406 extend from the top plate 404 of the slide bracket 402. Thus, when the slide bracket 402 is installed or nested within the outer bracket 502, a plurality of support rods (i.e., the support rods 406 and the support rod 510) extend upward from the top surface of the top plate 504 of the bracket 502. In addition, each of the side plates 506 includes a plurality of mounting holes 512 that are arranged to receive one or more roller members as will be detailed below. Here, each of the mounting holes 512 in the first side plate 506 are in alignment with the mounting holes 512 arranged in the second side plate 506. Also, in the illustrated embodiment, each of the side plates 506 includes four mounting holes 512; however, more or less may be utilized where more or less roller members are to be utilized.

FIG. 5A also illustrates a second set of mounting holes 514,516 arranged in each of the side plates 506, such that the mounting holes 514,516 in the first side plate 506 are in alignment with the mounting holes 514,516 in the opposing second side plate 506. As will be detailed below, either or both of the mounting holes 514,516 may be utilized to couple the outer bracket 502 (and the slide bracket 402 when installed therein) to the channel assembly 102. In particular, either or both of the mounting holes 514,516 may be configured to receive guide members (not illustrated), such as bolts, that travel and are retained within the slots 214,314 as the outer bracket 502 and slide bracket 402 translate along the guide rode 110.

FIG. 6 illustrates the arrangement of the various roller members in the slide assembly 112, according to one or more embodiment. It will be appreciated that the outer bracket 502 is not illustrated in FIG. 6 for ease of explanation. As illustrated, when the slide bracket 402 is installed within the outer bracket 502 (not depicted in FIG. 6), a plurality of roller members 602 may be arranged horizontally therein and a plurality of roller members 604 may be arranged vertically therein, and these horizontally and vertically oriented roller members 602,604 provide horizontal and vertical support against the guide rod 110. In the illustrated embodiment, the horizontal roller members 602 are secured within the mounting holes 512 of the opposing side plates 506 of the outer bracket 502 via bolts and nuts; however, other fasteners may be utilized. Again, the outer bracket 502 is not shown in FIG. 6 to better illustrate the manner in which the roller members 602,604 engage the guide rod 110. Moreover, the vertical roller members 604 are secured within the slide bracket 402 via bolts that extend upward through the mounting holes 416 arranged within the feet 414, and are received and secured within the mounting holes 408 aligned in the top plate 404, for example, via the welded nut on the underside of the top plate 404. However, other fastening means may be utilized to secure the bolts to the slide bracket 402 without departing from the present disclosure.

Figure 7A:
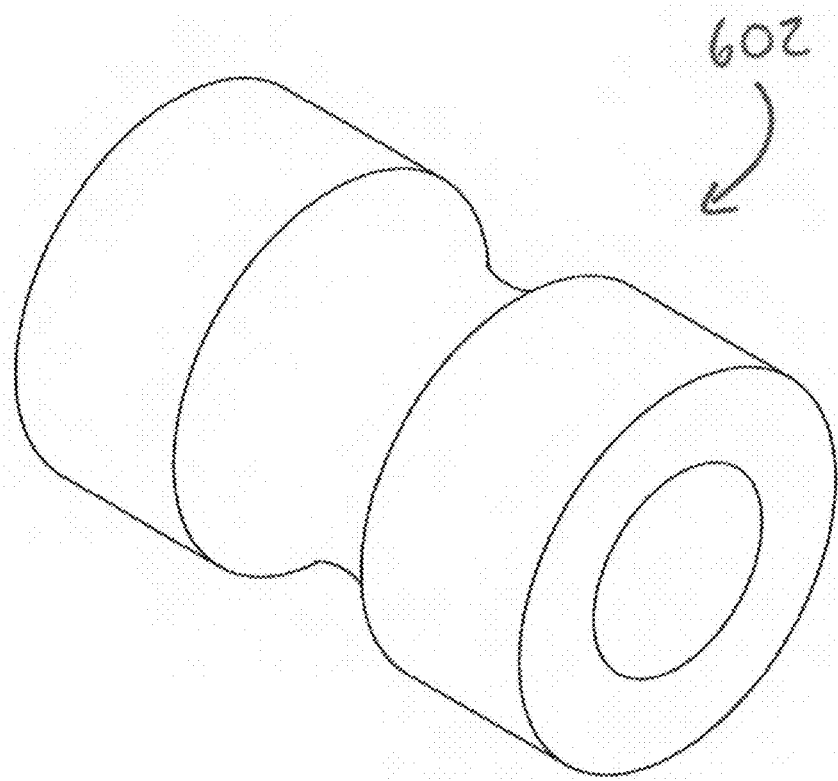
FIGS. 7A and 7B illustrate a horizontal roller member and a vertical roller member, respectively, according to one or more embodiments.
Figure 7B:
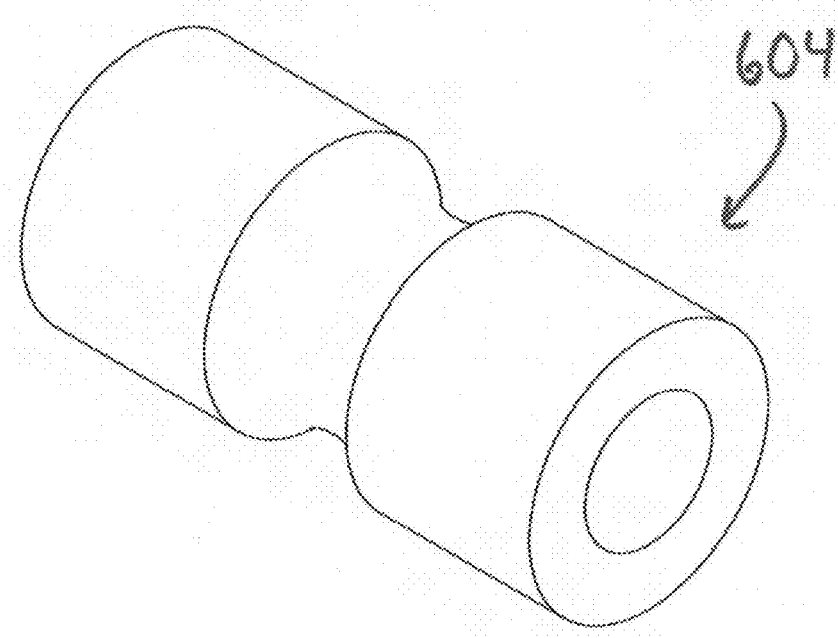

FIGS. 7A-7B respectively illustrate the horizontal roller member 602 and the vertical roller member 604, according to one or more embodiments of the present disclosure. In the illustrated embodiment, the roller members 602,604 are made of iron, iron alloy, steel, stainless steel, aluminum, aluminum alloy, or other structural material commonly selected for use in vehicle components as detailed above; however, in other embodiments, the roller member 602,604 may be manufactured from high strength ceramics or polymers.

Returning to FIG. 6, FIG. 6 also illustrates a guide member arranged with the slot 214 of the channel assembly 102, according to one or more embodiments. In this embodiment, the guide member is a bolt 606 that extends through the mounting holes 514 in the outer bracket 502 (not shown in FIG. 6). As the slide assembly 112 travels into the rear position (e.g., as shown in FIG. 1 and FIG. 6), the bolts 606 will travel into (i.e., be oriented in) the openings 218,318 of the slots 214,314. As previously mentioned, when the bolt 606 is oriented in the opening 218,318, the lip portion 220,320 functions as a safety "catch" that prevents any unintended forward movement that may occur, for example, in the event of an accident or crash. Similarly, a rear face of the stop gussets 222,322 may operate as a safety catch that impedes forward movement of the slide assembly 112 via an interference between it and a forward edge of the side plates 506 of the outer bracket 502 when, for example, an accident occurs resulting in force being applied down through a front end of the slide assembly 112 (i.e., near the support rod 510). As the slide assembly 112 actuates into the forward position (not illustrated), the bolts 606 ride into to the openings 216,316 at the front ends of the slots 214,314. The bolt 606 may be configured to rotate as it translates within the slots 214,314 and/or may be configured with a lubricious surface to inhibit friction when translating therein.

As detailed below, the bolt 606 also couples the outer bracket 502 to a shuttle member or driven member (see FIGS. 8-9) that translates within the channel member 204 in a path defined by the slots 214,314, and thereby actuating the slide assembly 112 along the guide rod 110. Also in this embodiment, a second bolt 608 extends through the mounting holes 516 in the outer bracket 502, and the second bolt 608 helps secure the driven member (e.g., a drive nut assembly as detailed below) and prevent the same from rocking or twisting relative to the remainder of the slide assembly 112 during operation. The bolt 608 may be similarly configured as the bolt 606. As will be detailed below, either or both of the bolts 606,608 may be utilized to secure the driven member within the slot 214,314, such that the driven member may be driven within the slot 214,314 which in turn drives the outer bracket 502 and slide bracket 402 connected thereto.

Figure 8:
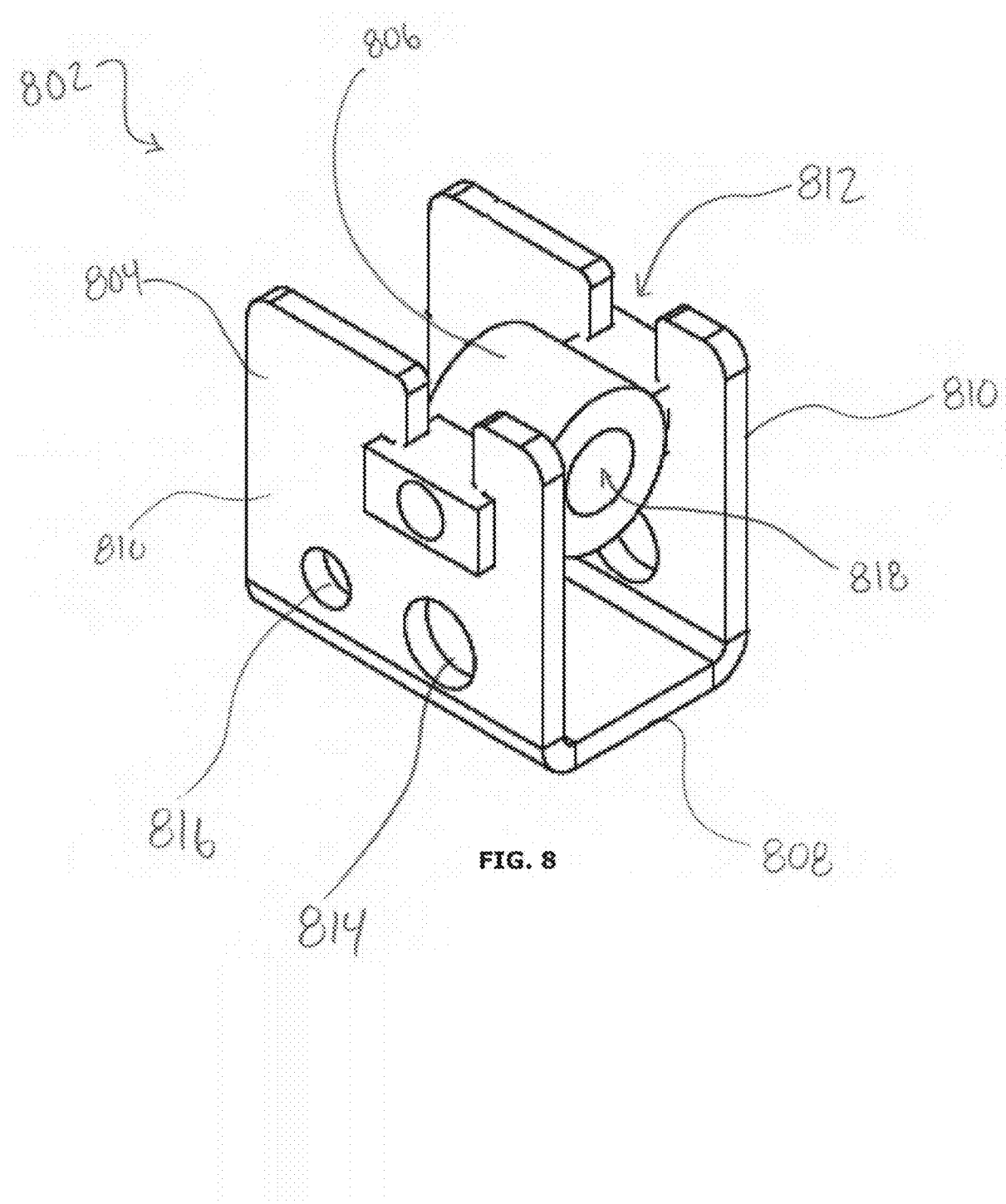
FIG. 8 illustrates a drive nut assembly according to one or more embodiments.

FIG. 8 illustrates an example embodiment where the driven member configured as a drive nut assembly 802. However, the driven member may be differently configured in other embodiments. Also, in embodiments where the sofa base includes the left and right channel assembly 102a,102c (i.e., but not the middle channel assembly 102b), the drive nut assembly 802 may be coupled within either the left channel assembly 102a or the right channel assembly 102c; however, the drive nut assembly 802 may instead be coupled within both the left and right channel assemblies 102a,102c. In other embodiments that also include the middle channel assembly 102b (i.e., in addition to the left and right channel assembly 102a,102c), the drive nut assembly 802 may be coupled within any of the channel assemblies 102, within any pair of the channel assemblies 102, or within all of the channel assemblies 102.

As mentioned, FIG. 8 illustrates the drive nut assembly 802, according to one or more embodiments. Here, the drive nut assembly 802 is a driven member having a bracket member 804 and a drive nut 806 arranged therein. In addition, the bracket member 804 includes a top plate 808 and a pair of sidewalls 810. Each of the sidewalls 810 include a cutout 812 arranged to receive and secure the drive nut 806. In addition, each of the sidewalls 810 includes mounting holes 814,816 that are arranged on the sidewalls 810 such that they align with the mounting holes 514,516 in the outer bracket 502 to receive a fastener or guide member such as the bolts 606,608, respectively, when assembled. Moreover, the drive nut 806 includes a bore 818 that is configured to engage a drive shaft and translate there along upon rotation of the drive shaft, as detailed below. For example, the bore 818 may include a plurality of threads.

Figure 9:
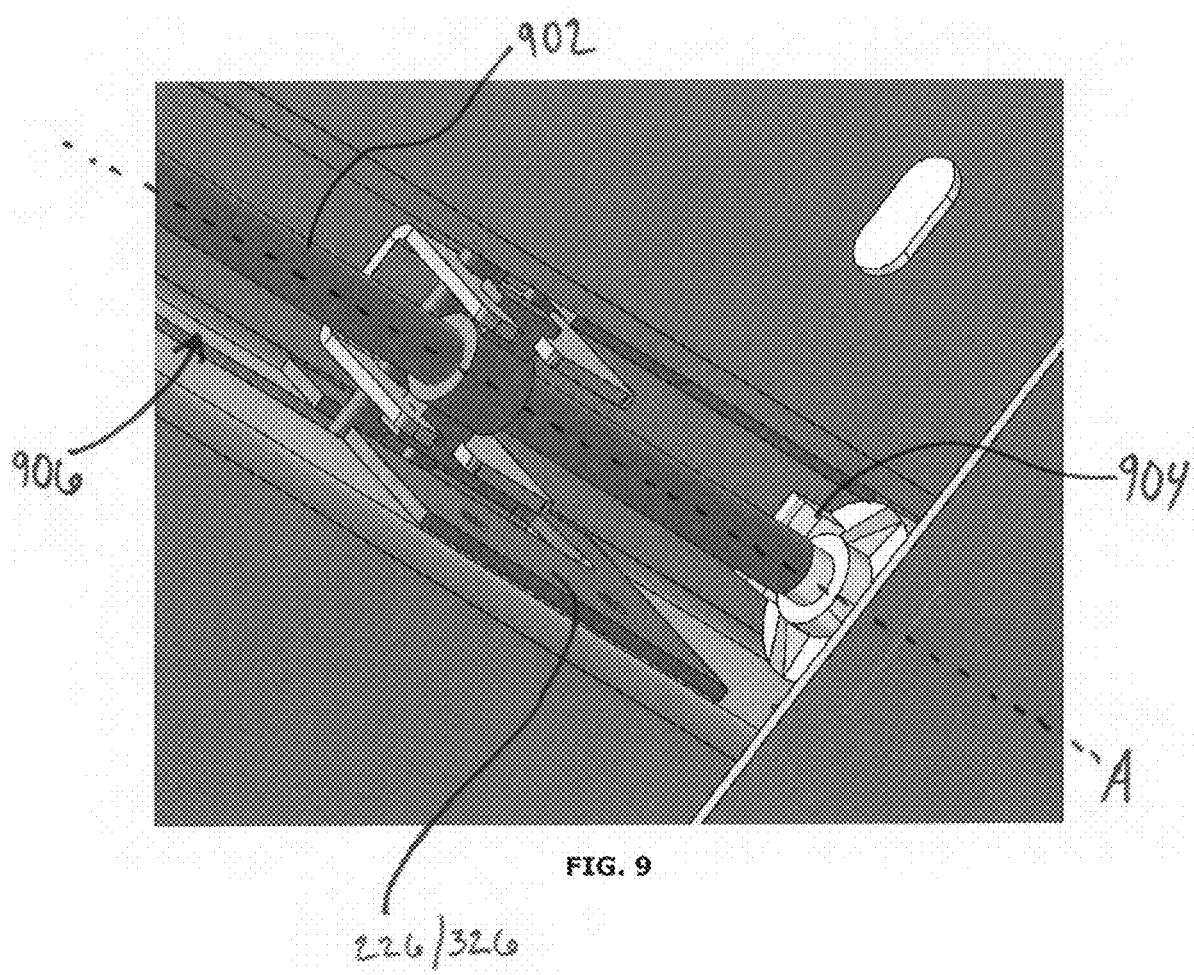
FIG. 9 is a bottom view of a channel assembly according to one or more embodiments.

FIG. 9 is a bottom view of any one of the channel assemblies 102 that includes a drive assembly, according to one or more embodiments. As mentioned, any or all of the channel assemblies 102 may be configured with drive assemblies as illustrated in FIG. 9. In one embodiment without the middle channel 102b, either one of the left and right channel assemblies 102a,102c is configured with drive assemblies as shown in FIG. 9.

As illustrated, the bore 818 of the drive nut 806 is configured to receive a drive member 902, and the drive member 902 includes a plurality of threads that correspond with the threads provided within the bore 818 of the drive nut 806. Thus, in the illustrated embodiment the drive member 902 is a threaded rod. As will be appreciated, the (threaded) drive member 902 is configured to rotate about a central axis A of the drive member 902 within an interior of the channel assembly 102. The corresponding threads of the bore 818 and the drive member 902 mesh or mate with each other such that a rotation of the drive member 902 causes the drive nut 806 to travel along the central axis A of the drive member 902. Accordingly, rotation of the drive member 902 in turn causes the drive nut assembly 802 to travel within the slot 214,314 and causes the outer bracket 502 and the slide bracket 402 to travel along the guide rod 110.

As previously discussed, each of the channel assemblies 102 may include openings (e.g., the openings 224,324) for receiving drive members or inputs such as the drive shafts 116,118. In addition, any or all of the channel assemblies 102 may include a gearbox (or gearing arrangement) that redirects or transfers rotation of the drive shafts 116,118 into a rotation of the drive member 902. For example, either the left or right channel assemblies 102a,102c may include a gear box 904 that is arranged as a worm drive (i.e., a worm gear arrangement) within an interior volume 906 (of the channel assembly 102) at a location proximate to the openings 224. In some embodiments, both the left and right channel assemblies 102a,102c include the gear box 904. Similarly, the middle channel assembly 102b may also (or instead) include the gear box 904 arranged within an interior volume 906 thereof at a location proximate to the opening 324. In these arrangements, the drive shafts 116,118 drive a worm gear (not illustrated) coupled thereto, which in turn meshes and drives the drive member 902 (i.e., the worm screw).

In the illustrated embodiment, the drive shaft 116 extends into the opening 224 of the left channel assembly 102a, where it is coupled to the gear box 904 arranged within the interior volume 906 of the left channel assembly 102a. Thus, rotation of the drive shaft 116 results in a rotation of the threaded rod 902 about the axis A via the gear box 904 that, in this embodiment, is arranged as a worm drive. Here, the left channel assembly 102a is configured as a drive channel and the other one or more channel assemblies (i.e., either or both of the middle channel assembly 102b and right channel assembly 102c) may be configured as "slave" channels that do not actuate the slide assemblies 112 disposed thereon. Thus, for example, the "slave" channels may be provided without the gear box 904, the drive member 902, and/or the drive nut assembly 802.

However, either or both of the middle channel assembly 102b and/or the right channel assembly 102c may also be configured as drive channels (and not "slave" channels). Therefore, the second drive shaft 118 is illustrated as extending from a side of the motor 114 that is opposite from the drive shaft 116, and extending into and through the opening 324 of the middle channel assembly 102b, and into the opening 224 of the right channel assembly 102c. With respect to the right channel assembly 102c, the drive shaft 118 extends into the opening 224 where it is coupled to the gear box 904 arranged within the interior volume 906 of the right channel assembly 102c. Thus, rotation of the drive shaft 118 results in a rotation of the threaded rod 902 about the axis A via the gear box 904 that, in this embodiment, is arranged as a worm drive. The middle channel assembly 102b may also include the gear box 904 within the interior volume 906 thereof, such that rotation of the drive shaft 118 results in a rotation of the threaded rod 902 about the axis A. Thus, any or all of the channel assemblies 102 may be configured as a drive channel and therefore include the gear box 904. In some examples, the sofa base 100 includes a pair of the channel assemblies 102 where one of them being configured as the drive channel and the other of them being configured as the "slave" channel. In other examples, both of the pair of channel assemblies 102 are configured as the drive channel. In even other examples, the sofa base 100 includes three or more of the channel assemblies 102, and any one or more of them are configured as the drive channels with the remaining (if any) configured as the "slave" channels.

FIG. 10 illustrates the sofa base 100 when assembled with an upper sofa assembly 1002 (but without seats or sofa). In the illustrated embodiment, the upper sofa assembly includes a plurality of risers 1004 and a plurality of cross members 1006,1008. The risers 1004 are arranged to be mounted on top of the outer bracket 502 and secured thereto via the support rods 406,510 of the slide bracket 402 and outer bracket 502. As will be appreciated, various types of seating (e.g., chairs or sofas) may be disposed upon the upper sofa assembly 1002. Moreover, the upper sofa assembly 1002 may be differently arranged to accommodate different types of seating and or different end use requirements.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

Use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A sofa base comprising:
    a first and a second channel assembly that each include a channel member and a guide rod extending along a length of the channel member, wherein the first channel assembly further includes a drive member extending within the channel member parallel to the guide rod; and
    a first and a second slide assembly respectively coupled to the first and a second channel assembly, the first and the second slide assembly each configured to translate along the length of the channel member and each having a plurality of rollers that engage the guide rod, wherein the first slide assembly further includes a driven member arranged on the drive member and configured to translate axially along the drive member upon rotation of the drive member,
    wherein the channel member of the first channel assembly includes a pair of slots extending parallel with the drive member, and the driven member includes at least one guide member that is configured to extend into the pair of slots.

2. The sofa base of claim 1, wherein the drive member is a threaded rod configured to rotate within the channel member and the driven member includes a drive nut that is coupled to the first slide assembly.

3. The sofa base of claim 1, wherein each of the pair of slots expands into a rear opening at a rear end of the slot and a front opening at a front end of the slot.

4. The sofa base of claim 3, the rear opening includes a lip at a front wall of the rear opening, wherein the lip is configured to catch the at least one guide member.

5. The sofa base of claim 3, wherein each of the slots includes a central portion extending between the rear opening and the front opening, the central portion being narrower than the front and rear openings.

6. The sofa base of claim 1, wherein each of the slide assemblies includes a first bracket and at least some of the plurality of rollers are arranged within the first bracket.

7. The sofa base of claim 6, wherein the plurality of rollers arranged within the first bracket are oriented normal to the guide rod.

8. The sofa base of claim 6, wherein each of the slide assemblies further includes a second bracket and at least some of the plurality of rollers are arranged within the second bracket.

9. The sofa base of claim 8, wherein the plurality of rollers arranged within the second bracket are oriented normal to both the guide rod and the rollers arranged within the first bracket.

10. The sofa base of claim 8, wherein the first bracket includes at least one support rod extending upward therefrom normal to the guide rod, and wherein the second bracket includes at least one opening that receives the at least one support rod of the first bracket when the first bracket is nested within the second bracket.

11. The sofa base of claim 10, wherein the second bracket includes a support rod extending upward therefrom parallel with at least one support rod of the first bracket.

12. The sofa base of claim 11, wherein a seat assembly is installed to the support rods of the first and second brackets.

13. The sofa base of claim 8, wherein the channel member of the first channel assembly includes a pair of slots extending parallel with the drive member, and the driven member includes at least one guide member that is configured to extend into the pair of slots, and the at least one guide member is attached to the second bracket such that the slide assembly translates with the driven member.

14. The sofa base of claim 8, wherein a gusset is provided on the channel member of at least the first channel assembly, wherein the gusset is configured to inhibit rearward translation of the slide assembly from a forward position to a rearward position when an upward force is applied to a front portion of the slide assembly.

15. The sofa base of claim 1, further comprising a motor configured to cause rotation of the drive member.

16. The sofa base of claim 15, wherein the motor rotates a drive shaft and the drive member is coupled to a gear box that redirects rotation of the drive shaft.

17. The sofa base of claim 1, wherein the second channel assembly further includes a second drive member extending within the channel member parallel to the guide rod, and wherein the second slide assembly further includes a second driven member arranged on the second drive member and configured to translate axially along the second drive member upon rotation of the second drive member.

18. The sofa base of claim 1, further comprising at least a third channel assembly and a third slide assembly that is coupled to the third channel assembly and configured to translate along a length of the third channel assembly.

19. The sofa base of claim 1, wherein first and second channel assemblies are provided on a frame.

20. The sofa base of claim 1, wherein the drive member is constrained by the first channel assembly.

21. The sofa base of claim 1, wherein the driven member is constrained by the first slide assembly.

22. A sofa base comprising:
a first and a second channel assembly that each include a channel member and a guide rod extending along a length of the channel member, wherein the first channel assembly further includes a drive member extending within the channel member parallel to the guide rod; and
a first and a second slide assembly respectively coupled to the first and a second channel assembly, the first and the second slide assembly each configured to translate along the length of the channel member and each having a plurality of rollers that engage the guide rod, wherein the first slide assembly further includes a driven member arranged on the drive member and configured to translate axially along the drive member upon rotation of the drive member,
wherein the guide rod is arranged external of the channel member associated therewith.

23. A sofa base comprising:
a first and a second channel assembly that each include a channel member and a guide rod extending along a length of the channel member, wherein the first channel assembly further includes a drive member extending within the channel member parallel to the guide rod; and
a first and a second slide assembly respectively coupled to the first and a second channel assembly, the first and the second slide assembly each configured to translate along the length of the channel member and each having a plurality of rollers that engage the guide rod, wherein the first slide assembly further includes a driven member arranged on the drive member and configured to translate axially along the drive member upon rotation of the drive member,
wherein each of the slide assemblies includes a first bracket and a second bracket wherein the first bracket includes at least one support rod extending upward therefrom normal to the guide rod, and wherein the second bracket includes at least one opening that receives the at least one support rod of the first bracket when the first bracket is nested within the second bracket.

* * * * *